United States Patent
Hirata et al.

(10) Patent No.: US 12,054,818 B2
(45) Date of Patent: Aug. 6, 2024

(54) DUPLEX STAINLESS STEEL TUBE AND WELDED JOINT

(71) Applicant: NIPPON STEEL CORPORATION, Tokyo (JP)

(72) Inventors: Hiroyuki Hirata, Tokyo (JP); Shohgo Aota, Tokyo (JP); Mitsuru Yoshizawa, Tokyo (JP); Takahiro Osuki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/001,149

(22) PCT Filed: Jun. 23, 2021

(86) PCT No.: PCT/JP2021/023808
§ 371 (c)(1),
(2) Date: Dec. 8, 2022

(87) PCT Pub. No.: WO2022/004526
PCT Pub. Date: Jan. 6, 2022

(65) Prior Publication Data
US 2023/0212724 A1    Jul. 6, 2023

(30) Foreign Application Priority Data
Jun. 30, 2020 (JP) .................. 2020-112671

(51) Int. Cl.
*C22C 38/58* (2006.01)
*C21D 8/10* (2006.01)
(Continued)

(52) U.S. Cl.
CPC ............ *C22C 38/58* (2013.01); *C21D 8/105* (2013.01); *C21D 9/08* (2013.01); *C22C 38/001* (2013.01);
(Continued)

(58) Field of Classification Search
CPC ..... C22C 38/58; C22C 38/001; C22C 38/002; C22C 38/005; C22C 38/008; C22C 38/02;
(Continued)

(56) References Cited

U.S. PATENT DOCUMENTS

| | | |
|---|---|---|
| 2019/0292639 A1 | 9/2019 | Fukuta et al. |
| 2019/0300980 A1 | 10/2019 | Hayashi et al. |
| 2020/0277680 A1 | 9/2020 | Yonenaga |

FOREIGN PATENT DOCUMENTS

| | | | | |
|---|---|---|---|---|
| EP | 3418416 A1 | * | 12/2018 | ............... C21D 1/26 |
| JP | S5821009 A | * | 2/1983 | |

(Continued)

OTHER PUBLICATIONS

Tokyo Seimitsu Co., Ltd, "Application Guide Manual for Surfcom Series Surface Roughness & Waviness Parameters", Aug. 25, 2016, URL: <https://web.archive.org/web/20160825200553/http://gaugeshop.com/_images/roughness/applications_guide_surface_finish.pdf>, Title page and p. 5-1 (Year: 2016).*

(Continued)

*Primary Examiner* — Katherine A Christy
(74) *Attorney, Agent, or Firm* — Greer, Burns & Crain, Ltd.

(57) ABSTRACT

There is provided a duplex stainless steel tube including a chemical composition consisting of, in mass %, C: 0.008 to 0.030%, Si: 0.10 to 0.70%, Mn: 0.80 to 2.60%, P: 0.030% or less, S: 0.0001 to 0.0050%, O: 0.0004 to 0.0150%, Sn: 0.0001% or more to less than 0.0100%, Cu: 0.10 to 2.50%, Ni: more than 2.50 to 5.50% or less, Cr: 21.5 to 25.5%, Mo: 0.10 to 0.50%, N: 0.050 to 0.200%, Al: 0.200% or less, and optional elements, with the balance: Fe and impurities, wherein 4S+8O+Sn is 0.0040 to 0.0900, and 4S+Sn is 0.0180 or less.

12 Claims, 1 Drawing Sheet

(51) Int. Cl.
*C21D 9/08* (2006.01)
*C22C 38/00* (2006.01)
*C22C 38/02* (2006.01)
*C22C 38/06* (2006.01)
*C22C 38/42* (2006.01)
*C22C 38/44* (2006.01)
*C22C 38/48* (2006.01)
*C22C 38/50* (2006.01)
*C22C 38/52* (2006.01)
*C22C 38/54* (2006.01)
*F16L 13/02* (2006.01)

(52) U.S. Cl.
CPC .......... *C22C 38/002* (2013.01); *C22C 38/005* (2013.01); *C22C 38/008* (2013.01); *C22C 38/02* (2013.01); *C22C 38/06* (2013.01); *C22C 38/42* (2013.01); *C22C 38/44* (2013.01); *C22C 38/48* (2013.01); *C22C 38/50* (2013.01); *C22C 38/52* (2013.01); *C22C 38/54* (2013.01); *F16L 13/02* (2013.01)

(58) Field of Classification Search
CPC ......... C22C 38/06; C22C 38/42; C22C 38/44; C22C 38/48; C22C 38/50; C22C 38/52; C22C 38/54; F16L 13/02
USPC .......................................................... 428/544
See application file for complete search history.

(56) References Cited

FOREIGN PATENT DOCUMENTS

| | | | | |
|---|---|---|---|---|
| JP | 2011168838 A | | 9/2011 | |
| JP | 2012180567 A | * | 9/2012 | ............... B21B 3/00 |
| JP | 2016204714 A | * | 12/2016 | |
| JP | 2016216809 A | | 12/2016 | |
| JP | 2017002352 A | | 1/2017 | |
| JP | 2017095794 A | | 6/2017 | |
| JP | 2019157218 A | | 9/2019 | |
| WO | 2017141907 A1 | | 8/2017 | |
| WO | 2019054390 A1 | | 3/2021 | |

OTHER PUBLICATIONS

Abe et al., JP 2016204714 A Google Patents machine translation printed on May 25, 2023, Dec. 8, 2016, entire translation (Year: 2016).*

Jiyosefu et al., JPS-5821009-A machine translation printed on May 31, 2023, Feb. 7, 1983, entire translation (Year: 1983).*

Haruhiko et al., JP 2012180567A Google Patents machine translation printed on May 31, 2023, Sep. 20, 2012, entire translation (Year: 2012).*

* cited by examiner

DUPLEX STAINLESS STEEL TUBE AND WELDED JOINT

TECHNICAL FIELD

The present invention relates to a duplex stainless steel tube and a welded joint.

BACKGROUND ART

Duplex stainless steel, which includes ferritic phases and austenite phases, has high strength as well as good corrosion resistance under an environment containing corrosive substances such as chloride. With these advantages, the duplex stainless steel is used as a material of tubes for transmitting fluids, specifically, tubes for a heat exchanger in a petrochemical plant and a seawater processing plant, a fuel injection tube mounted in an automobile, and tubes in a food plant. In addition, duplex stainless steel that is lean and has further enhanced strength and corrosion resistance has recently been proposed, as described in Patent Documents 1 and 2.

LIST OF PRIOR ART DOCUMENTS

Patent Document

Patent Document 1: JP2011-168838A
Patent Document 2: WO 2017/141907

SUMMARY OF INVENTION

Technical Problem

When duplex stainless steel is used in a form of tubes in a structure such as the heat exchanger and the fuel injector described above, the tubes may be assembled by welding. At this time, if a weld reinforcement of an internal bead sags to have an excessive height, corrosive fluid stays at a toe of the weld reinforcement, which concentrates corrosive substance, causing damage in some cases. To prevent this, a heat input in welding is normally reduced.

However, this may produce a case where a butting surface is not melted completely in the welding, resulting in a weld defect. In addition, in the duplex stainless steel, a balance between ferritic phases and austenite phases in its weld heat affected zone may be disturbed, resulting in a loss of toughness. Therefore, this is not necessarily an effective measure. Unfortunately, it is difficult for a tube made of duplex stainless steel both to form an internal bead having a good usability of a weldment stably and to keep a toughness of a weld heat affected zone.

The present invention is to solve the problems and has an objective to provide a duplex stainless steel tube that enables stable formation of an internal bead having a good usability of a weldment and has a good toughness of a weld heat affected zone, and to provide a welded joint.

Solution to Problem

The present invention is made to solve the above problems, and the gist of the present invention is the following duplex stainless steel tube and welded joint.

(1) A duplex stainless steel tube including a chemical composition consisting of, in mass %:
C: 0.008 to 0.030%,
Si: 0.10 to 0.70%,
Mn: 0.80 to 2.60%,
P: 0.030% or less,
S: 0.0001 to 0.0050%,
O: 0.0004 to 0.0150%,
Sn: 0.0001% or more to less than 0.0100%,
Cu: 0.10 to 2.50%,
Ni: more than 2.50% to 5.50% or less,
Cr: 21.5 to 25.5%,
Mo: 0.10 to 0.50%,
N: 0.050 to 0.200%,
Al: 0.200% or less,
Ca: 0 to 0.0100%,
Co: 0 to 0.80%,
W: 0 to 0.80%,
Ti: 0 to 0.40%,
V: 0 to 0.40%,
Nb: 0 to 0.40%,
Ta: 0 to 0.40%,
Mg: 0 to 0.0100%,
B: 0 to 0.0100%, and
REM: 0 to 0.0800%,
with the balance: Fe and impurities, wherein
Fn1 given by Formula (i) below is 0.0040 to 0.0900, and
Fn2 given by Formula (ii) below is 0.0180 or less, $$Fn1 = 4S + 8O + Sn \qquad (i)$$

$$Fn2 = 4S + Sn \qquad (ii)$$

where symbols of elements in the formulas indicate contents (mass %) of the elements contained in the steel, and when an element is not contained, zero will be set to the corresponding symbol.

(2) The duplex stainless steel tube according to (1) above, wherein
the chemical composition contains, in mass %,
C: 0.012 to 0.020%,
Si: 0.20 to 0.60%,
Mn: 1.70 to 2.30%,
P: 0.028% or less,
S: 0.0001 to 0.0015%,
Cu: 0.25 to 2.00%,
Ni: 3.50 to 4.50%,
Cr: 22.5 to 24.5%,
Mo: 0.20 to 0.40%,
N: 0.100 to 0.180%, and
Al: 0.020% or less,
the Fn1 is 0.0050 to 0.0800, and
the Fn2 is 0.0140 or less.

(3) The duplex stainless steel tube according to (1) or (2) above, wherein
the chemical composition contains, in mass %, Ca: 0.0005 to 0.0100%, and
a ratio between a content of Ca and a content of S, Ca/S, is 1.0 to 40.0.

(4) The duplex stainless steel tube according to any one of (1) to (3) above, wherein the chemical composition contains one or more elements selected from, in mass %:
Co: 0.01 to 0.80%,
W: 0.01 to 0.80%,
Ti: 0.01 to 0.40%,
V: 0.01 to 0.40%,
Nb: 0.01 to 0.40%,
Ta: 0.01 to 0.40%,
Mg: 0.0005 to 0.0100%,
B: 0.0002 to 0.0100%, and
REM: 0.0005 to 0.0800%.

(5) The duplex stainless steel tube according to any one of (1) to (4) above, wherein, on an internal surface of the duplex stainless steel tube, an arithmetic average roughness Ra of the tube in a longitudinal direction is 9.0 μm or less.

(6) A welded joint including the duplex stainless steel tube according to any one of (1) to (5) above.

Advantageous Effects of Invention

The present invention makes it possible to provide a duplex stainless steel tube that enables stable formation of an internal bead having a good usability of a weldment and has a good toughness of a weld heat affected zone, and to provide a welded joint.

DESCRIPTION OF EMBODIMENTS

Figure 1:
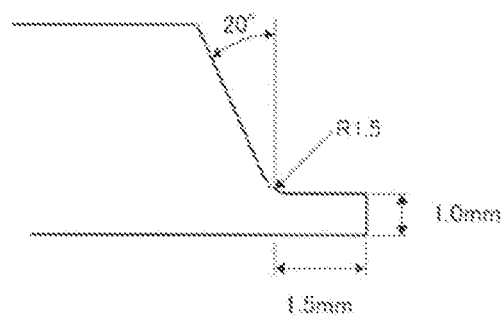
FIG. 1 is a diagram illustrating a bevel shape in EXAMPLE.

The present inventors conducted in-depth studies about butt welding of duplex stainless steel, specifically a duplex stainless steel tube having a content of Cr of 21.5 to 25.5%, a content of Ni of 2.50 to 5.50%, and a content of Sn of 0.0001 to 0.0100% and obtained the following findings (a) to (e).

(a) A Shape of an internal bead formed during the butt welding is greatly influenced by contents of S, Sn, and O (oxygen) contained in the tube. The present inventors found that, if the contents of these elements are small, the internal bead is not formed stably, resulting in an unmelted butting surface partly remaining. In contrast, if the contents of these elements are excessive, although the internal bead can be formed stably, the resultant bead has a convex shape, and a height of weld reinforcement of the bead becomes excessively high.

(b) Possible factors of these elements that influence formation of an internal bead are as follows. S and O are surface-active elements and thus have an effect of decreasing a surface tension of molten metal. This strengthen inward convection in a molten pool in welding. As a result, it becomes easy to transmit welding heat from arcs in a depth direction, allowing an internal bead to be formed stably. Further, Sn evaporates from a surface of the molten pool during welding, forming an energizing path for arcs to increase a current density in the arcs, which similarly contributes to the formation of the internal bead effectively. Containing these elements is therefore effective in forming the internal bead stably.

On the other hand, if the steel contains these elements excessively, it is difficult for the steel to be melted in a width direction, and a surface tension of molten metal of the steel is decreased, which makes the molten metal prone to sag even if the molten metal has the same amount as a molten metal of steel not containing these elements excessively. The resultant internal bead have a convex shape, failing to form the bead stably. Additionally, a shape of an internal bead is influenced by a surface roughness of an internal surface of the tube in its longitudinal direction. A high surface roughness is prone to make an internal bead have a convex shape. In particular, when a surface roughness of an internal surface of a tube in a longitudinal direction is high, molten metal resists spreading in a width direction, further making the resultant internal bead have a convex shape.

(c) A toughness of a weld heat affected zone is decreased with an increase in contents of S and Sn. The present inventors considered that the decrease in toughness is caused by the following. With an increase in the contents of S and Sn, ferritic phases embrittle. In particular, in a weld heat affected zone of duplex stainless steel, the decrease in toughness is prominent through some weld thermal cycle due to a large proportion of ferritic phases compared with its base metal.

(d) Therefore, making the steel contain S, Sn, and O within ranges of their contents that satisfy a predetermined relation is effective in providing an internal bead that is stable and has a good shape and providing a good toughness of a weld heat affected zone. In addition, appropriately controlling upper limits of the contents of S and Sn is effective.

(e) Further, to provide these properties stably, it is desirable to contain Ca within a predetermined range and to manage a ratio between Ca and S contents, namely, Ca/S within a proper range. In addition, to provide an internal bead having better shape, it is desirable to control the surface roughness of the internal surface of the tube in its longitudinal direction within a predetermined range.

The present invention has been made based on the above findings. Requirements of the present invention will be described below in detail.

1. Chemical Composition

Reasons for limiting a content of each element are as follows. In the following description, the symbol "%" for contents means "mass %".

C: 0.008 to 0.030%

C (carbon) has an effect of stabilizing austenite phases, thus contributing to keeping a balance between ferritic phases and the austenite phases within a proper range. To provide the effect within ranges of contents of the other elements, a content of C is set to 0.008% or more. The content of C is preferably set to 0.010% or more, more preferably set to 0.012% or more, and still more preferably set to 0.014% or more. However, if C is contained excessively, C combines with Cr through a weld thermal cycle to form carbide in crystal grain boundaries in a weld heat affected zone. Cr depleted zones are then caused to develop in vicinities of the crystal grain boundaries, decreasing corrosion resistance. The content of C thus needs to be set to 0.030% or less. The content of C is preferably set to 0.025% or less, and more preferably set to 0.020% or less.

Si: 0.10 to 0.70%

Si (silicon) is used as a deoxidizer in production of the steel. Further, Si has an effect of stabilizing ferritic phases, thus contributing to keeping a phase balance within a proper range. To provide the effect within ranges of contents of the other elements, a content of Si is set to 0.10% or more. The content of Si is preferably set to 0.15% or more, more preferably set to 0.20% or more, and still more preferably set to 0.30% or more. However, if Si is contained excessively, weld crack susceptibility is increased. Further, the excessive containing of Si may make it difficult to form an internal bead stably. The content of Si is thus set to 0.70% or less. The content of Si is preferably set to 0.65% or less, more preferably set to 0.60% or less, and still more preferably set to 0.50% or less.

Mn: 0.80 to 2.60%

As with Si, Mn (manganese) is contained as a deoxidizer in production of the steel. Further, Mn has an effect of stabilizing austenite phases, thus having an effect of keeping a phase balance within a proper range. Moreover, Mn makes a considerable contribution to stable formation of an internal bead. To provide the effect within ranges of contents of the other elements, a content of Mn is set to 0.80% or more. The content of Mn is preferably set to 1.00% or more, more preferably set to 1.50% or more, and still more preferably set to 1.70% or more. However, if Mn is contained excessively, hot workability is decreased, and corrosion resistance is decreased. The content of Mn is thus set to 2.60% or less. The content of Mn is preferably set to 2.40% or less, more preferably set to 2.30% or less, and still more preferably set to 2.20% or less.

P: 0.030% or less

P (phosphorus) is contained in the steel as an impurity and significantly increases weld crack susceptibility. A content of P is thus set to 0.030% or less. The content of P is preferably set to 0.028% or less, and more preferably set to 0.025% or less. Note that the content of P is preferably reduced as much as possible; that is, the content may be 0%, but an extreme reduction of the content leads to a rise in production costs. For this reason, the content of P is preferably set to 0.001% or more, and more preferably set to 0.002% or more.

S: 0.0001 to 0.0050%

S (sulfur) is normally contained in the steel as an impurity, but in the tube according to the present invention, S contributes to increasing capability of forming an internal bead during welding together with Sn and O. A content of S is thus set to 0.0001% or more. The content of S is preferably set to 0.0002% or more, and more preferably set to 0.0003% or more. However, if S is contained excessively, the internal bead is made to have a convex shape, and weld crack susceptibility is increased. Further, a toughness of a weld heat affected zone is decreased. The content of S is thus set to 0.0050% or less. The content of S is preferably set to 0.0030% or less, and more preferably set to 0.0015% or less. In addition, S needs to be contained in such a manner as to satisfy ranges of Fn1 and Fn2 given by Formulas (i) and (ii), respectively, as described later. Further, S desirably satisfies a relation with Ca as described later.

O: 0.0004 to 0.0150%

O (oxygen) is normally contained in the steel as an impurity, but in the tube according to the present invention, O contributes to increasing capability of forming an internal bead during welding together with S and Sn. For this reason, a content of O is set to 0.0004% or more. The content of O is preferably set to 0.0006% or more, and more preferably set to 0.0008% or more. However, if O is contained excessively, the internal bead is made to have a convex shape, and hot workability is decreased. The content of O is thus set to 0.0150% or less. The content of O is preferably set to 0.0120% or less, and more preferably set to 0.0100% or less. In addition, O needs to be contained in such a manner as to satisfy a range of Fn1 given by Formula (i) as described later.

Sn: 0.0001% or more to less than 0.0100%

Sn (tin) has an effect of increasing corrosion resistance and an effect of increasing a weld penetration depth to increase a capability of forming an internal bead. Sn is thus intentionally made to be contained, and a content of Sn is set to 0.0001% or more. The content of Sn is preferably set to 0.0010% or more, and more preferably set to 0.0020% or more. However, if Sn is contained excessively, a toughness of a weld heat affected zone is decreased, and weld crack susceptibility is increased. The content of Sn is thus set to less than 0.0100%. The content of Sn is preferably set to 0.0095% or less, and more preferably set to 0.0090% or less.

In addition, Sn needs to be contained in such a manner as to satisfy ranges of Fn1 and Fn2 given by Formulas (i) and (ii), respectively, as described later.

Here, Fn1 given by Formula (i) below is set to 0.0040 to 0.0900.

$$Fn1 = 4S + 8O + Sn \quad (i)$$

where symbols of elements in the formula indicate contents (mass %) of the elements contained in the steel, and when an element is not contained, zero will be set to the corresponding symbol.

As described above, S and O act as surface-active elements, having an action of strengthening inward convection in a molten pool in welding. Heat from arcs is thus transmitted in a depth direction. Further, Sn evaporates from a surface of the molten pool during welding, forming an energizing path for arcs to increase a current density in the arcs. As a result, Sn contributes to stable formation of an internal bead.

Fn1 being less than 0.0040 results in a failure in the stable formation of an internal bead. Fn1 is therefore set to 0.0040 or more. Fn1 is preferably set to 0.0045 or more, and more preferably set to 0.0050 or more.

On the other hand, Fn1 being more than 0.0900 makes the resultant metal resist being melted in a width direction of a tube and results in a decrease in surface tension of the molten metal. As a result, sagging of the molten metal occurs, making the resultant internal bead have a convex shape. Fn1 is therefore set to 0.0900 or less. Fn1 is preferably set to 0.0850 or less, more preferably set to 0.0800 or less, and still more preferably set to 0.070 or less.

Likewise, Fn2 given by Formula (ii) below is set to 0.0180 or less.

$$Fn2 = 4S + Sn \quad (ii)$$

where symbols of elements in the formula indicate contents (mass %) of the elements contained in the steel, and when an element is not contained, zero will be set to the corresponding symbol.

As described above, S and Sn contribute to the stable formation of an internal bead; however, if S and Sn are contained excessively, ferritic phases embrittle. In particular, in a weld heat affected zone, the decrease in toughness is prominent through some weld thermal cycle due to a large proportion of ferritic phases compared with its base metal. Fn2 is thus set to 0.0180 or less so as to ensure a toughness of a weld heat affected zone. Fn2 is preferably set to 0.0160 or less, more preferably set to 0.0140 or less, and still more preferably set to 0.0120 or less.

Cu: 0.10 to 2.50%

Cu (copper) has an effect of stabilizing austenite phases, thus contributing to keeping a phase balance between ferritic phases and the austenite phases within a proper range. Further, Cu is effective in enhancing corrosion resistance, particularly corrosion resistance in a chloride environment. To provide the effect within ranges of contents of the other elements, a content of Cu is set to 0.10% or more. The content of Cu is more preferably set to 0.18% or more, and more preferably set to 0.25% or more. However, if Cu is contained excessively, hot workability is decreased. The content of Cu is thus set to 2.50% or less. The content of Cu is preferably set to 2.30% or less, more preferably set to 2.00% or less, and still more preferably set to 1.70% or less.

Ni: more than 2.50% to 5.50% or less

Ni (nickel) has an effect of stabilizing austenite phases, thus contributing to keeping a phase balance between ferritic phases and the austenite phases within a proper range.

Further, Ni is effective in enhancing stress corrosion cracking resistance in a chloride environment. To provide the effect within ranges of contents of the other elements, a content of Ni is set to more than 2.50%. The content of Ni is preferably set to 3.00% or more, and more preferably set to 3.50% or more. However, Ni is an expensive element; therefore, if Ni is contained excessively, production costs are increased. Further, the excessive containing of Ni deteriorates the phase balance in the steel, deteriorating various types of properties. The content of Ni is thus set to 5.50% or less. The content of Ni is preferably set to 5.00% or less, and more preferably set to 4.50% or less.

Cr: 21.5 to 25.5%

Cr (chromium) has an effect of stabilizing ferritic phases, thus contributing to keeping a phase balance between the ferritic phases and austenite phases within a proper range. Further, Cr has an effect of ensuring corrosion resistance by forming a passivation film. To provide the effect within ranges of contents of the other elements, a content of Cr is set to 21.5% or more. The content of Cr is preferably set to 22.0% or more, and more preferably 22.5% or more. However, if Cr is contained excessively, the phase balance is deteriorated, and various types of properties are deteriorated. The content of Cr is thus set to 25.5% or less. The content of Cr is preferably set to 25.0% or less, and more preferably set to 24.5% or less.

Mo: 0.10 to 0.50%

Mo (molybdenum) has an effect of stabilizing ferritic phases, thus contributing to keeping a phase balance between the ferritic phases and austenite phases within a proper range. Further, Mo is effective in enhancing corrosion resistance and increases strength through its solid-solution strengthening effect. To provide the effect within ranges of contents of the other elements, a content of Mo is set to 0.10% or more. The content of Mo is preferably set to 0.15% or more, and more preferably set to 0.20% or more. However, Mo is an expensive element; therefore, if Mo is contained excessively, production costs are increased. Further, the excessive containing of Mo causes production of brittle phases through a weld thermal cycle, decreasing a toughness of a weld heat affected zone. The content of Mo is thus set to 0.50% or less. The content of Mo is preferably set to 0.45% or less, more preferably set to 0.40% or less, and still more preferably set to 0.35% or less.

N: 0.050 to 0.200%

N (nitrogen) has an effect of stabilizing austenite phases, thus contributing to keeping a phase balance between ferritic phases and the austenite phases within a proper range. Further, N is effective in enhancing pitting resistance and increases strength through its solid-solution strengthening effect. To provide the effect within ranges of contents of the other elements, a content of N is set to 0.050% or more. The content of N is preferably set to 0.080% or more, more preferably 0.100% or more, and still more preferably 0.120% or more. However, if N is contained excessively, nitride precipitates, decreasing ductility. The content of N is thus set to 0.200% or less. The content of N is preferably set to 0.180% or less, and more preferably set to 0.150% or less.

Al: 0.200% or less

Al (aluminum) is used as a deoxidizer in production of the steel; however, if Al is contained excessively, Al combines with oxygen, which decreases cleanliness, impairing hot workability. In addition, the excessive containing of Al may make it difficult to form an internal bead stably. A content of Al is thus set to 0.200% or less. The content of Al is preferably set to 0.020% or less, more preferably set to 0.018% or less, and still more preferably set to 0.015% or less. Note that a lower limit of the content of Al is not limited to a specific content; however, in order to provide the deoxidation effect sufficiently, the content of Al is preferably set to 0.001% or more, and more preferably set to 0.002% or more.

In addition to the elements described above, Ca may be further contained within the range described below.

Ca: 0 to 0.0100%

Ca (calcium) has an effect of improving hot workability by combining with S and is effective in providing a stable surface roughness on an internal surface of the tube, which will be described later, by preventing defects from developing on an inner surface of the tube in production of the tube. Further, Ca also enhances a toughness of a weld heat affected zone. Thus, it may be contained as necessary. However, if Ca is contained excessively, Ca combines with oxygen, which significantly decreases cleanliness, rather decreasing hot workability, deteriorates the surface roughness of the inner surface of the tube, and also decreases a toughness of a weld heat affected zone. A content of Ca is thus set to 0.0100% or less. The content of Ca is preferably set to 0.0080% or less, and more preferably set to 0.0060% or less. On the other hand, to obtain the effects, the content of Ca is preferably set to 0.0005% or more. The content of Ca is preferably set to 0.0008% or more, and more preferably set to 0.0010% or more. Further, Ca needs to satisfy the relation with S described later.

Ca/S: 1.0 to 40.0

As described above, Ca combines with S to remove the adverse effect of S, enhancing hot workability and a toughness of a weld heat affected zone. To provide the effects stably, a ratio between the content of Ca and the content of 5, Ca/S, is preferably set to 1.0 or more. Ca/S is more preferably set to 1.5 or more, still more preferably set to 1.8 or more, and most preferably set to 2.0 or more. However, if Ca/S is more than 40.0, Ca combines with oxygen to produce its oxide, as a result of which hot workability and a toughness of a weld heat affected zone are rather decreased. Therefore, Ca/S is preferably set to 40.0 or less. Ca/S is more preferably set to 35.0 or less, still more preferably set to 30.0 or less, and most preferably set to 25.0 or less.

In addition to the elements described above, one or more elements selected from Co, W, Ti, V, Nb, Ta, Mg, B, and REM may be contained within their respective ranges described below. Reasons for limiting a content of each element will be described.

Co: 0 to 0.80%

Co (cobalt) has an effect of stabilizing austenite phases. Thus, it may be contained as necessary. However, Co is a very expensive element; therefore, if Co is contained excessively, production costs are significantly increased. A content of Co is thus set to 0.80% or less. The content of Co is preferably set to 0.75% or less, and more preferably set to 0.70% or less. On the other hand, to provide the effect, the content of Co is preferably set to 0.01% or more, and more preferably set to 0.02% or more.

W: 0 to 0.80%

W (tungsten) has an effect of stabilizing ferritic phases. Further, W has an effect of enhancing corrosion resistance and an effect of increasing strength through its solid-solution strengthening. Thus, it may be contained as necessary. However, W is an expensive element; therefore, if W is contained excessively, production costs are increased. A content of W is thus set to 0.80% or less. The content of W is preferably set to 0.75% or less, and more preferably set to 0.70% or less. On the other hand, to provide the effects, the content of W is preferably set to 0.01% or more, and more preferably set to 0.02% or more.

Ti: 0 to 0.40%

Ti (titanium) combines with carbon to form its carbide, preventing production of Cr carbide, thus having an effect of mitigating deterioration in corrosion resistance of grain boundaries. Thus, it may be contained as necessary. However, if Ti is contained excessively, Ti precipitates in a large amount in a form of its carbide and carbo-nitride, decreasing ductility. A content of Ti is thus set to 0.40% or less. The content of Ti is preferably set to 0.35% or less, and more preferably set to 0.30% or less. On the other hand, to provide the effect, the content of Ti is preferably set to 0.01% or more, and more preferably set to 0.02% or more.

V: 0 to 0.40%

As with Ti, V (vanadium) combines with carbon to form its carbide, preventing production of Cr carbide, thus having an effect of mitigating deterioration in corrosion resistance of grain boundaries. Thus, it may be contained as necessary. However, if V is contained excessively, V precipitates in a large amount in a form of its carbide and carbo-nitride, decreasing ductility. A content of V is thus set to 0.40% or less. The content of V is preferably set to 0.35% or less, and more preferably set to 0.30% or less. On the other hand, to provide the effect, the content of V is preferably set to 0.01% or more, and more preferably set to 0.02% or more.

Nb: 0 to 0.40%

As with Ti and V, Nb (niobium) also combines with carbon to form its carbide, preventing production of Cr carbide, thus having an effect of mitigating deterioration in corrosion resistance of grain boundaries. Thus, it may be contained as necessary. However, if Nb is contained excessively, Nb precipitates in a large amount in a form of its carbide and carbo-nitride, decreasing ductility. Further, the excessive containing of Nb also increases weld crack susceptibility. A content of Nb is thus set to 0.40% or less. The content of Nb is preferably set to 0.35% or less, and more preferably set to 0.30% or less. On the other hand, to provide the effect, the content of Nb is preferably set to 0.01% or more, and more preferably set to 0.02% or more.

Ta: 0 to 0.40%

Ta (tantalum) has an effect of accelerating production of a passivation film of Cr, increasing corrosion resistance. Thus, it may be contained as necessary. However, if Ta is contained excessively, Ta precipitates in a large amount in a form of its carbide, decreasing ductility. A content of Ta is thus set to 0.40% or less. The content of Ta is preferably set to 0.35% or less, and more preferably set to 0.30% or less. On the other hand, to provide the effect, the content of Ta is preferably set to 0.01% or more, and more preferably set to 0.02% or more.

Mg: 0 to 0.0100%

As with Ca, Mg (magnesium) has an effect of improving hot workability. Thus, it may be contained as necessary. However, if Mg is contained excessively, Mg combines with oxygen, which decreases cleanliness significantly, rather decreasing hot workability. A content of Mg is thus set to 0.0100% or less. The content of Mg is preferably set to 0.0080% or less, and more preferably set to 0.0060% or less. On the other hand, to provide the effect, the content of Mg is preferably set to 0.0005% or more, and more preferably set to 0.0010% or more.

B: 0 to 0.0100%

By segregating in grain boundaries at high temperature, B (boron) has an effect of strengthening the grain boundaries, so as to increase hot workability. Thus, it may be contained as necessary. However, if B is contained excessively, weld crack susceptibility is increased. A content of B is thus set to 0.0100% or less. The content of B is preferably set to 0.0080% or less, and more preferably 0.0060% or less. On the other hand, to provide the effect, the content of B is preferably set to 0.0002% or more, and more preferably 0.0005% or more.

REM: 0 to 0.0800%

As with Ca and Mg, REM (rare earth metal) has an effect of improving hot workability in production of the steel. Thus, it may be contained as necessary. However, if REM is contained excessively, REM combines with oxygen, which decreases cleanliness significantly, rather decreasing hot workability. A content of REM is thus set to 0.0800% or less. The content of REM is preferably set to 0.0600% or less, and more preferably set to 0.0500% or less. On the other hand, to provide the effect, the content of REM is preferably set to 0.0005% or more, and more preferably set to 0.0010% or more.

REM refers to Sc (scandium), Y (yttrium), and lanthanoid, 17 elements in total, and the content of REM means a total content of these elements. Industrially, REM is often added in a form of misch metal.

In the chemical composition according to the present invention, the balance is Fe and impurities. The term "impurities" herein means components that are mixed in the duplex stainless steel in producing the duplex stainless steel industrially from raw materials such as ores and scraps and due to various factors in the production process and that are allowed to be mixed in the duplex stainless steel within their respective ranges in which the impurities have no adverse effect on the present invention.

2. Surface Roughness of Tube

An internal bead is formed when ends of duplex stainless steel tubes are welded together. To form a good internal bead, it is preferable to control an arithmetic average roughness Ra in a longitudinal direction on an internal surface of the tube.

The surface roughness of the alloy tube herein refers to a surface roughness after a final process in a production process. That is, although the surface roughness of the alloy tube fluctuates in a course of the production, a surface roughness in a middle of the production has no connection with providing the advantageous effects of the present invention, and it will suffice that the surface roughness of the tube in the longitudinal direction after the final process satisfies a range specified in the present invention.

On the internal surface of the duplex stainless steel tube, if the arithmetic average roughness Ra of the tube in the longitudinal direction is more than 9.0 μm, weld metal is hindered from wetting on the internal surface of the tube, and thus the weld metal resists spreading along a width direction, that is, a circumference of the tube. The resultant internal bead tends to have a convex shape, and thus a height of weld reinforcement tends to increase. Therefore, on the internal surface of the stainless steel tube, the arithmetic average roughness Ra of the tube in the longitudinal direction is preferably set to 9.0 μm or less. The arithmetic average roughness Ra is preferably set to 7.0 μm or less, and more preferably set to 5.0 μm or less. Note that a lower limit value of the arithmetic average roughness Ra is not limited to a specific value; however, in a case where a production method described later is used, the resultant arithmetic average roughness Ra is normally 0.1 to 1.0 μm or more in many cases.

The arithmetic average roughness Ra is specified in JIS B 0601:2001 and can be measured by using a contact-type surface roughness instrument.

3. Welded Joint

A welded joint can be provided by performing butt welding on tube ends of duplex stainless steel tubes as described above under predetermined conditions. The welded joint of the duplex stainless steel tubes includes a weld metal into which molten metal is solidified as a joint portion and includes base metal portions. The base metal portions each includes a weld heat affected zone that is influenced by heat input of welding. The base metal portion excluding the weld heat affected zone inherits the chemical composition, the surface roughness, and other properties of the duplex stainless steel tube described above. A weldment refers to the weld metal and the weld heat affected zone.

Note that, over the entire circumference of the welded joint, an internal bead preferably has a bead width of 1.0 mm or more. The bead width is more preferably 2.0 mm or more. Further, over the entire circumference, a height of the internal bead is preferably 1.5 mm or less, and more preferably 1.0 mm or less, from the viewpoint of corrosion resistance.

4. Production Method

A preferable production method for the duplex stainless steel tube according to the present invention will be described. The duplex stainless steel tube according to the present invention provides its advantageous effects irrespective of its production method as long as the duplex stainless steel tube has the configuration described above; nonetheless, the duplex stainless steel tube can be produced stably by a production method described below, for example.

4-1. Duplex Stainless Steel Tube

First, an ingot of duplex stainless steel to be a starting material of the duplex stainless steel tube is produced. The ingot is preferably produced by melting an alloy having the chemical composition described above using an electric furnace or the like, refining the alloy to remove impurities, and then casting the alloy. Note that, rather than producing the ingot, a bloom may be produced by continuous casting.

Subsequently, the resultant ingot is preferably subjected to hot forging or hot rolling to be formed into a billet. Then, the resultant billet is preferably subjected to hot extrusion and then to cold rolling or cold drawing. In the middle of the working, softening heat treatment and intermediate pickling may be performed when necessary. Then, the tube is preferably subjected to solid solution heat treatment as heat treatment. After the solid solution heat treatment, pickling or working may be performed when necessary.

Here, in order to bring the arithmetic average roughness Ra of the tube in the longitudinal direction to 9.0 µm or less, it is preferable to perform the following process. Specifically, the solid solution heat treatment is preferably performed under such conditions where heating is performed in a temperature region of 920° C. to 1180° C. for 1 to 15 minutes and water cooling is performed. Additionally, it is preferable to subject the internal surface of the tube to machining such as grinder processing and grinding, as well as shotblast or shotpeening treatment.

Although the surface roughness Ra fluctuates in a course of the production, the advantageous effects of the present invention have no connection with a surface roughness in a middle of the course and is influenced only by the surface roughness of the tube in the longitudinal direction after the final process.

4-2. Welded Joint of Duplex Stainless Steel Tube

A welded joint can be provided by welding together end portions of duplex stainless steel tubes according to the present invention as starting materials. A method for the welding is not limited to a specific method; however, the welding can be performed by arc welding, for example. As a condition for performing arc welding, for example, a heat input is preferably set to be within the range from 4 to 20 kJ/cm and is preferably adjusted in accordance with the chemical composition, a bevel shape, and the like as appropriate. In addition, it is preferable to use Ar gas as shielding gas and back shielding gas during welding. A flow rate of the gas flowed to a welding location is preferably adjusted as appropriate.

A chemical composition of a welding material (filler material) to be used is not limited to a specific material, either; however, the chemical composition is preferably a composition described below. That is, the chemical composition preferably consists of C: 0.050% or less, Si: 1.00% or less, Mn: 3.00% or less, P: 0.030% or less, Sn: 0.030% or less, S: 0.0001 to 0.0100%, Cu: 3.00% or less, Co: 10.0% or less, Ni: 4.0 to 10.0%, Cr: 20.0 to 29.0%, at least one of Mo and W: 1.0 to 6.0% in total, at least one of Nb, Ta, Ti, and V: 1.00% or less in total, N: 0.05 to 0.35%, Al: 0.20% or less, O: 0.0004 to 0.0150%, and Ca: 0.010% or less, with the balance being Fe and impurities. Further, the ratio between the content of Ca and the content of S, Ca/S, is preferably within the range of 0.3 to 30.0, and the contents of S, O, and Sn preferably satisfy Formula (a) shown below.

$$0.0040 \leq 4S + 8O + Sn \leq 0.0900 \tag{a}$$

where symbols of elements in the formula indicate contents (mass %) of the elements contained in the welding material.

The present invention will be described below more specifically with reference to examples, but the present invention is not limited to these examples.

Example 1

Materials of steel types A to M having chemical compositions shown in Table 1 were melted and produced into ingots. Thereafter, the following steps simulating steps for a tube were performed. Specifically, thicknesses of the materials were adjusted to 12 mm by hot forging and hot rolling. Subsequently, scales formed on their surfaces were removed by pickling. At this time, the arithmetic average roughness Ra was about 15 µm in every steel type.

Subsequently, some of the materials were subjected to cold rolling, which was performed after softening heat treatment, to have a thickness of 3 mm. Materials having subjected to the hot rolling and the cold rolling were subjected to solid solution heat treatment in which the materials were held at 1000° C. for 10 minutes and then water cooled. From these materials, plates each having a width of 50 mm and a length of 100 mm were cut by machining and used as test specimens.

For test specimens having a thickness of 3 mm, shotpeening was performed on their one sides as a simulation of an internal surface of a tube. For test specimens not subjected to the shotpeening, their one sides were machine-ground or polished one to five times using a whetstone with a granularity of #40 or #60. Then, arithmetic average roughnesses in a width direction of surfaces of the plates subjected to the shotpeening, machine-grinding, or polishing were measured with a contact type roughness gauge.

TABLE 1

| Steel type | Chemical Composition (mass %, Balance: Fe and Impurities) | | | | | | | | | | | | | | | |
|---|---|---|---|---|---|---|---|---|---|---|---|---|---|---|---|---|
| | C | Si | Mn | P | S | O | Sn | Cu | Ni | Cr | Mo | N | Al | Ca | Co | W |
| A | 0.015 | 0.40 | 1.95 | 0.016 | 0.0006 | 0.0065 | 0.0018 | 0.30 | 3.91 | 22.9 | 0.28 | 0.135 | 0.008 | — | — | — |
| B | 0.014 | 0.38 | 2.08 | 0.018 | 0.0015 | 0.0040 | 0.0015 | 0.25 | 4.05 | 23.2 | 0.30 | 0.148 | 0.010 | — | — | — |
| C | 0.020 | 0.58 | 2.30 | 0.025 | 0.0002 | 0.0072 | 0.0008 | 1.96 | 4.47 | 24.4 | 0.39 | 0.103 | 0.006 | 0.0013 | 0.12 | — |
| D | 0.012 | 0.21 | 1.72 | 0.020 | 0.0008 | 0.0036 | 0.0012 | 1.90 | 3.53 | 22.7 | 0.21 | 0.150 | 0.009 | — | — | 0.20 |
| E | 0.016 | 0.20 | 1.85 | 0.015 | 0.0002 | 0.0005 | 0.0003 | 0.85 | 4.25 | 22.8 | 0.33 | 0.132 | 0.012 | — | — | — |
| F | 0.015 | 0.45 | 2.17 | 0.019 | 0.0013 | 0.0082 | 0.0087 | 0.90 | 3.88 | 23.1 | 0.36 | 0.140 | 0.015 | — | — | — |
| G | 0.025 | 0.64 | 1.50 | 0.021 | 0.0020 | 0.0090 | 0.0097 | 0.18 | 3.07 | 22.0 | 0.15 | 0.082 | 0.010 | — | — | — |
| H | 0.010 | 0.15 | 2.38 | 0.028 | 0.0002 | 0.0004 | 0.0002 | 2.29 | 4.90 | 24.8 | 0.45 | 0.178 | 0.006 | — | — | — |
| I | 0.010 | 0.63 | 1.50 | 0.027 | 0.0024 | 0.0054 | 0.0090 | 0.15 | 2.60 | 25.0 | 0.45 | 0.080 | 0.010 | — | — | — |
| J | 0.013 | 0.20 | 1.63 | 0.023 | 0.0001 | 0.0004 | 0.0003 | 0.40 | 3.98 | 23.1 | 0.32 | 0.122 | 0.018 | — | — | — |
| K | 0.012 | 0.55 | 1.70 | 0.020 | 0.0028 | 0.0102 | 0.0040 | 0.48 | 4.10 | 22.6 | 0.38 | 0.117 | 0.003 | 0.0009 | — | — |
| L | 0.008 | 0.63 | 1.51 | 0.027 | 0.0055* | 0.0010 | 0.0003 | 0.11 | 2.53 | 25.3 | 0.45 | 0.065 | 0.008 | — | — | — |
| M | 0.009 | 0.65 | 1.52 | 0.028 | 0.0017 | 0.0062 | 0.0110* | 0.12 | 2.52 | 25.1 | 0.47 | 0.056 | 0.009 | — | — | — |

| Steel type | Chemical Composition (mass %, Balance: Fe and Impurities) | | | | | | | | | |
|---|---|---|---|---|---|---|---|---|---|---|
| | Ti | V | Nb | Ta | Mg | B | REM | Fn1 | Fn2 | Ca/S |
| A | — | — | — | — | — | — | — | 0.0562 | 0.0042 | — |
| B | — | — | — | — | — | — | — | 0.0395 | 0.0075 | — |
| C | — | — | 0.05 | 0.03 | — | — | — | 0.0592 | 0.0016 | 6.5 |
| D | — | 0.04 | — | — | 0.0010 | — | — | 0.0332 | 0.0044 | — |
| E | — | — | — | — | — | — | — | 0.0051 | 0.0011 | — |
| F | 0.06 | — | — | — | — | 0.0015 | 0.0048 | 0.0795 | 0.0139 | — |
| G | — | — | — | — | — | — | — | 0.0897 | 0.0177 | — |
| H | — | — | — | — | — | — | — | 0.0042 | 0.0010 | — |
| I | — | — | — | — | — | — | — | 0.0618 | 0.0186* | — |
| J | — | — | — | — | — | — | — | 0.0039* | 0.0007 | — |
| K | — | — | — | — | — | — | — | 0.0968* | 0.0152 | 0.3 |
| L | — | — | — | — | — | — | — | 0.0303 | 0.0223* | — |
| M | — | — | — | — | — | — | — | 0.0674 | 0.0178 | — |

The mark "*" indicates that the value with the mark fell out of the chemical composition specified in the present invention.
Fn1 = 4S + 80 + Sn . . . (i)
Fn2 = 4S + Sn . . . (ii)

TABLE 2

| Test piece sign | Steel type | Plate thickness (mm) | Production condition Treatment of back-side | Properties Arithmetic average roughness Ra (μm) |
|---|---|---|---|---|
| A1 | A | 3 | Shotpeening | 2.2 |
| A2 | | | Machine grinding | 6.8 |
| A3 | | | Polishing (#40 × once) | 9.2 ** |
| A4 | | | Polishing (#40 × twice) | 7.1 |
| A5 | | | Polishing (#60 × once) | 6.7 |
| A6 | | | Polishing (#60 × twice) | 5.1 |
| A7 | | | Polishing (#60 × three times) | 3.0 |
| A8 | | | Polishing (#60 × four times) | 1.4 |
| A9 | | | Polishing (#60 × five times) | 1.1 |
| A10 | | 12 | — | — |
| B1 | B | 3 | Shotpeening | 2.4 |
| B2 | | | Machine grinding | 6.6 |
| B3 | | | Polishing (#40 × once) | 9.3 ** |
| B4 | | | Polishing (#40 × twice) | 7.0 |
| B5 | | | Polishing (#60 × once) | 6.6 |
| B6 | | | Polishing (#60 × twice) | 5.3 |
| B7 | | | Polishing (#60 × three times) | 3.2 |
| B8 | | | Polishing (#60 × four times) | 1.5 |
| B9 | | | Polishing (#60 × five times) | 1.0 |
| B10 | | 12 | — | — |
| C1 | C | 3 | Shotpeening | 2.2 |
| C2 | | 12 | — | — |
| D1 | D | 3 | Shotpeening | 2.1 |
| D2 | | 12 | — | — |
| E1 | E | 3 | Shotpeening | 2.5 |
| E2 | | 12 | — | — |
| F1 | F | 3 | Shotpeening | 2.3 |
| F2 | | 12 | — | — |
| G1 | G | 3 | Shotpeening | 2.5 |
| G2 | | 12 | — | |

TABLE 2-continued

| Test piece sign | Steel type | Plate thickness (mm) | Production condition Treatment of back-side | Properties Arithmetic average roughness Ra (μm) |
|---|---|---|---|---|
| H1 | H | 3 | Shotpeening | 2.2 |
| H2 | | 12 | — | — |
| I1 | I * | 3 | Shotpeening | 2.2 |
| I2 | | 12 | — | — |
| J1 | J * | 3 | Shotpeening | 2.4 |
| J2 | | 12 | — | — |
| K1 | K * | 3 | Shotpeening | 2.3 |
| K2 | | 12 | — | — |
| L1 | L * | 3 | Shotpeening | 2.0 |
| L2 | | 12 | — | — |
| M1 | M * | 3 | Shotpeening | 2.2 |
| M2 | | 12 | — | — |

The mark "*" indicates that the value with the mark fell out of the range specified in the present invention.
The mark "**" indicates that the value with the mark fell out of the preferable range of surface roughness in the present invention.

Two test specimens each obtained by subjecting end face of the test specimen having a thickness of 3 mm in a longitudinal direction to beveling illustrated in FIG. 1 were butted against each other at their end faces and subjected to root pass welding by automatic gas tungsten arc welding. Note that, in the welding, the root pass welding was performed with a filler material having a chemical composition shown in Table 3 and having an outer diameter of 1.0 mm, thus obtained a welded joint. A heat input in the welding was set to about 5 kJ/cm, and Ar was used as shielding gas and back shielding gas, with its flow rate set to 10 L/min.

TABLE 3

| Chemical Composition (mass %, Balance: Fe and impurities) | | | | | | | | | | | | |
|---|---|---|---|---|---|---|---|---|---|---|---|---|
| C | Si | Mn | P | S | Cu | Ni | Cr | Mo | N | Al | O | 4S + 8O + Sn |
| 0.009 | 0.38 | 1.55 | 0.028 | 0.0025 | 0.38 | 8.2 | 22.3 | 3.10 | 0.103 | 0.008 | 0.0062 | 0.0596 |

Of the resultant welded joints, welded joints in each of which a back bead was formed across an overall length of its weld line were determined to have no problem in capability of forming an internal bead of the corresponding steel tube and were rated as "Good." Of such welded joints, welded joints in each of which a width of a back bead was 2 mm or more across an overall length of its weld line were rated as "Excellent", and welded joints in each of which a width of a back bead formed was less than 2 mm but 1 mm or more were rated as "Acceptable." Welded joints not rated as "Good" were rated as "Failed."

Thereafter, three cross sections were made to appear from each welded joint, and a welded joint all sections of which had a back bead height of 1.0 mm or less is determined to be good in shape of an internal bead of the corresponding steel tube and is rated as "Good." Of such welded joints, a welded joint all sections of which had a back bead height of 0.8 mm or less is rated as "Excellent", and the other welded joints were rated as "Acceptable." Welded joints not rated as "Good" were rated as "Failed." Note that, in the present example, a back bead corresponds to an internal bead that is formed when the welding is performed from an outside of the alloy tube.

Figure 2:
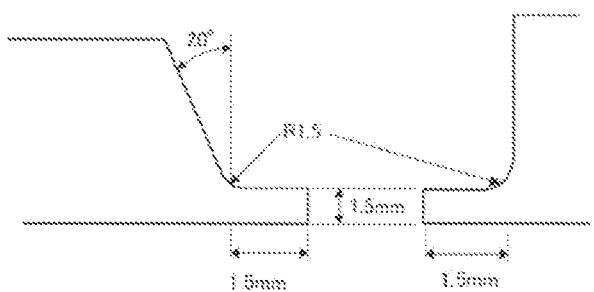
FIG. 2 is a diagram illustrating bevel shapes in butt welding in EXAMPLE.

A pair of steel plates having a thickness of 12 mm were subjected to beveling illustrated in FIG. 2 in a longitudinal direction, butted against each other, and subjected to multi-pass welding in the bevel by the automatic gas tungsten arc welding. In the welding, a filler material having a chemical composition shown in Table 4 and having an outer diameter of 1.2 mm was used, and a heat input was set to about 9 to 12 kJ/cm. Further, Ar was used as shielding gas and hack shielding gas for the welding, with its flow rate set to 10 L/min.

TABLE 4

| Chemical Composition (mass %. Balance: Fe and impurities) | | | | | | | | | | | | |
|---|---|---|---|---|---|---|---|---|---|---|---|---|
| C | Si | Mn | P | S | Cu | Ni | Cr | Mo | N | Al | O | 4S + 8O + Sn |
| 0.007 | 0.41 | 1.60 | 0.022 | 0.0020 | 0.40 | 8.4 | 22.4 | 3.26 | 0.098 | 0.010 | 0.0065 | 0.0600 |

From each of the resultant welded joints, three 2-mm V-notch full-size Charpy impact test specimens, in each of which a notch was provided at a position 1 mm from a fusion line on a bevel face on a vertical side, were extracted and subjected to the Charpy Impact Test. The Charpy impact test was conducted in conformance with JIS Z2242:2005. The test was conducted at −40° C. Cases where an average value of absorbed energies of three test specimens was 100 J or more were rated as "Good". Of the cases rated as "Good", cases where values of the absorbed energies of the three test specimens were all 100 J or more were rated as "Good/Excellent", and the other cases were rated as "Good/Acceptable". In contrast, cases where the average value of the absorbed energies of the three test specimens fell below 100 J were rated as "Failed."

ferritic phases becomes prominent in its weld heat affected zone, and the impact properties did not satisfy targeted impact properties. In test pieces L2 and M2 obtained from

TABLE 5

| Test piece sign | Steel type | Welded joint | | | |
|---|---|---|---|---|---|
| | | Capability of forming back bead | Shape of back bead | Charpy impact test | |
| A1 | A | Good (Excellent) | Good (Excellent) | — | Inventive example |
| A2 | | Good (Excellent) | Good (Excellent) | — | |
| A3 | | Good (Excellent) | Good (Acceptable) | — | |
| A4 | | Good (Excellent) | Good (Excellent) | — | |
| A5 | | Good (Excellent) | Good (Excellent) | — | |
| A6 | | Good (Excellent) | Good (Excellent) | — | |
| A7 | | Good (Excellent) | Good (Excellent) | — | |
| A8 | | Good (Excellent) | Good (Excellent) | — | |
| A9 | | Good (Excellent) | Good (Excellent) | — | |
| A10 | | — | — | Good (Excellent) | |
| B1 | B | Good (Excellent) | Good (Excellent) | — | |
| B2 | | Good (Excellent) | Good (Excellent) | — | |
| B3 | | Good (Excellent) | Good (Acceptable) | — | |
| B4 | | Good (Excellent) | Good (Excellent) | — | |
| B5 | | Good (Excellent) | Good (Excellent) | — | |
| B6 | | Good (Excellent) | Good (Excellent) | — | |
| B7 | | Good (Excellent) | Good (Excellent) | — | |
| B8 | | Good (Excellent) | Good (Excellent) | — | |
| B9 | | Good (Excellent) | Good (Excellent) | — | |
| B10 | | — | — | Good (Excellent) | |
| C1 | C | Good (Excellent) | Good (Excellent) | — | |
| C2 | | — | — | Good (Excellent) | |
| D1 | D | Good (Excellent) | Good (Excellent) | — | |
| D2 | | — | — | Good (Excellent) | |
| E1 | E | Good (Excellent) | Good (Excellent) | — | |
| E2 | | — | — | Good (Excellent) | |
| F1 | F | Good (Excellent) | Good (Excellent) | — | |
| F2 | | — | — | Good (Excellent) | |
| G1 | G | Good (Excellent) | Good (Acceptable) | — | |
| G2 | | — | — | Good (Acceptable) | |
| H1 | H | Good (Acceptable) | Good (Excellent) | — | |
| H2 | | — | — | Good (Excellent) | |
| I1 | I * | Good (Excellent) | Good (Excellent) | — | Comparative example |
| I2 | | — | — | Failed | |
| J1 | J * | Failed | Good (Excellent) | — | |
| J2 | | — | — | Good (Excellent) | |
| K1 | K * | Good (Excellent) | Failed | — | |
| K2 | | — | — | Good (Acceptable) | |
| L1 | L * | Good (Excellent) | Good (Excellent) | — | |
| L2 | | — | — | Failed | |
| M1 | M * | Good (Excellent) | Good (Excellent) | — | |
| M2 | | — | — | Failed | |

The mark "*" indicates that the value with the mark fell out of the range specified in the present
The underline indicates that the underlined value fell out of properties targeted in the present From Table 5, it is understood that test pieces obtained from signs A to H, which satisfied the chemical composition specified in the present invention, allowed their back beads to be formed sufficiently and to have good shapes. Further, it is also understood that the test pieces offered good impact properties of their weld heat affected zones. From test pieces A3 and A4, and B3 and B4, it is understood that when the arithmetic average roughness Ra of a back surface satisfies the preferable range, the capability of forming a back bead and a shape of the back bead becomes more excellent.

In contrast, a test piece J1 obtained from a sign J gave Fn1 that fell below its lower limit value. As a result, melting in a sheet thickness direction was not sufficient, failing to provide a capability of forming a back bead as targeted. A test piece K1 obtained from a sign K gave Fn1 that exceeded its upper limit value. As a result, its molten metal sagged significantly, which made a height of its back bead high, failing to provide a desired bead shape.

A test piece I2 obtained from a sign I gave Fn2 that exceeded its upper limit value. As a result, embrittlement of signs L and M, their contents of S and Sn exceeded the respective ranges specified in the present invention. As a result, impact properties of their weld heat affected zones did not satisfy targeted impact properties.

Example 2

Materials of steel types N to W having chemical compositions shown in Table 6 were melted and produced into ingots. Thereafter, the following steps simulating steps for a tube were performed, as in EXAMPLE 1. Specifically, thicknesses of the materials were adjusted to 12 mm by hot forging and hot rolling. Subsequently, scales formed on their surfaces were removed by pickling. At this time, the arithmetic average roughness Ra was about 15 μm in every steel type except signs V and W. Note that the signs V and W each contained excessively large amounts of S and Ca over their predetermined ranges, and as a result, deep surface defects developed in the hot working. Thus, the subsequent steps and test were not conducted.

Subsequently, some of the materials were subjected to cold rolling, which was performed after softening heat treatment, to have a thickness of 3 mm. Materials having subjected to the hot rolling and the cold rolling were subjected to solid solution heat treatment in which the materials were held at 1000° C. for 10 minutes and then water cooled. From these materials, plates each having a width of 50 mm and a length of 100 mm were cut by machining and used as test specimens.

For test specimens having a thickness of 3 mm, shotpeening was performed on their one sides as a simulation of an internal surface of a tube. Then, arithmetic average roughnesses in a width direction of surfaces of the plates subjected to the shotpeening were measured with a contact type roughness gauge.

TABLE 6

Chemical Composition (mass %, Balance: Fe and Impurities)

| Steel type | C | Si | Mn | P | S | O | Sn | Cu | Ni | Cr | Mo | N | Al | Ca | Co |
|---|---|---|---|---|---|---|---|---|---|---|---|---|---|---|---|
| A<Table 1> | 0.015 | 0.40 | 1.95 | 0.016 | 0.0006 | 0.0065 | 0.0018 | 0.30 | 3.91 | 22.9 | 0.28 | 0.135 | 0.008 | — | — |
| B<Table 1> | 0.014 | 0.38 | 2.08 | 0.018 | 0.0015 | 0.0040 | 0.0015 | 0.25 | 4.05 | 23.2 | 0.30 | 0.148 | 0.010 | — | — |
| N | 0.017 | 0.35 | 2.10 | 0.018 | 0.0010 | 0.0050 | 0.0010 | 0.34 | 3.95 | 22.5 | 0.31 | 0.140 | 0.011 | 0.0035 | — |
| O | 0.018 | 0.38 | 2.02 | 0.017 | 0.0002 | 0.0042 | 0.0023 | 0.40 | 3.90 | 23.0 | 0.31 | 0.135 | 0.010 | 0.0010 | — |
| P | 0.016 | 0.45 | 2.11 | 0.017 | 0.0028 | 0.0045 | 0.0009 | 0.35 | 4.15 | 23.5 | 0.32 | 0.127 | 0.009 | 0.0060 | — |
| Q | 0.016 | 0.24 | 1.96 | 0.019 | 0.0009 | 0.0052 | 0.0015 | 0.42 | 4.08 | 23.1 | 0.28 | 0.131 | 0.009 | 0.0016 | 0.08 |
| R | 0.020 | 0.30 | 1.98 | 0.020 | 0.0002 | 0.0030 | 0.0020 | 0.50 | 4.20 | 22.8 | 0.35 | 0.139 | 0.010 | 0.0048 | — |
| S | 0.022 | 0.32 | 2.10 | 0.019 | 0.0003 | 0.0067 | 0.0067 | 0.53 | 3.98 | 23.4 | 0.30 | 0.142 | 0.008 | 0.0080 | — |
| T | 0.019 | 0.57 | 1.72 | 0.028 | 0.0001 | 0.0088 | 0.0051 | 0.28 | 3.53 | 24.5 | 0.39 | 0.120 | 0.011 | 0.0041 | — |
| U | 0.018 | 0.58 | 1.75 | 0.027 | 0.0039 | 0.0070 | 0.0005 | 0.27 | 3.50 | 24.4 | 0.40 | 0.132 | 0.009 | 0.0034 | — |
| V | 0.020 | 0.55 | 1.80 | 0.027 | 0.0098* | 0.0045 | 0.0008 | 0.30 | 3.52 | 24.4 | 0.38 | 0.178 | 0.008 | 0.0090 | — |
| W | 0.021 | 0.57 | 1.78 | 0.029 | 0.0012 | 0.0068 | 0.0010 | 0.31 | 3.60 | 24.0 | 0.38 | 0.180 | 0.009 | 0.0502 * | — |

Chemical Composition (mass %, Balance: Fe and Impurities)

| Steel type | W | Ti | V | Nb | Ta | Mg | B | REM | Fn1 | Fn2 | Ca/S |
|---|---|---|---|---|---|---|---|---|---|---|---|
| A<Table 1> | — | — | — | — | — | — | — | — | 0.0562 | 0.0042 | _** |
| B<Table 1> | — | — | — | — | — | — | — | — | 0.0395 | 0.0075 | _** |
| N | — | — | — | — | — | — | — | — | 0.0450 | 0.0050 | 3.5 |
| O | — | — | — | — | — | — | — | — | 0.0367 | 0.0031 | 5.0 |
| P | — | — | — | — | — | — | — | — | 0.0481 | 0.0121 | 2.1 |
| Q | — | 0.04 | 0.03 | — | — | — | 0.0010 | 0.0030 | 0.0467 | 0.0051 | 1.8 |
| R | — | — | — | — | — | — | — | — | 0.0268 | 0.0028 | 24.0 |
| S | 0.14 | — | — | 0.03 | 0.02 | 0.0008 | — | — | 0.0615 | 0.0079 | 26.7 |
| T | — | 0.34 | — | — | — | — | — | — | 0.0759 | 0.0055 | 41.0** |
| U | 0.51 | — | — | — | — | — | — | — | 0.0721 | 0.0161 | 0.9** |
| V | — | — | — | — | — | — | — | — | 0.0760 | 0.0400* | 0.9** |
| W | — | — | — | — | — | — | — | — | 0.0602 | 0.0058 | 41.8** |

The mark "*" indicates that the value with the mark fell out of the chemical composition specified in the present invention.
The mark "**" indicates that Ca/S fell out of its range specified in dependent claim.
Fn1 = 4S + 80 + Sn . . . (i)
Fn2 = 4S + Sn . . . (ii)

TABLE 7

| Test piece sign | Steel type | Plate thickness (mm) | Production condition Treatment of back-side | Properties Arithmetic average roughness Ra (μm) |
|---|---|---|---|---|
| A11 | A | 12 | — | — |
| B11 | B | 12 | — | — |
| N1 | N | 3 | Shotpeening | 2.3 |
| N2 | | 12 | — | — |
| N3 | | 12 | — | — |
| O1 | O | 3 | Shotpeening | 2.4 |
| O2 | | 12 | — | — |
| O3 | | 12 | — | — |
| P1 | P | 3 | Shotpeening | 2.3 |
| P2 | | 12 | — | — |
| P3 | | 12 | — | — |
| Q1 | Q | 3 | Shotpeening | 2.4 |
| Q2 | | 12 | — | — |
| Q3 | | 12 | — | — |
| R1 | R | 3 | Shotpeening | 2.2 |
| R2 | | 12 | — | — |
| R3 | | 12 | — | — |
| S1 | S | 3 | Shotpeening | 2.5 |
| S2 | | 12 | — | — |
| S3 | | 12 | — | — |
| T1 | T | 3 | Shotpeening | 2.9 |
| T2 | | 12 | — | — |
| T3 | | 12 | — | — |
| U1 | U | 3 | Shotpeening | 3.0 |
| U2 | | 12 | — | — |
| U3 | | 12 | — | — |

The mark "*" indicates that the value with the mark fell out of the range specified in the present invention.

Two test specimens each obtained by subjecting an end face of the test specimen having a thickness of 3 mm in a longitudinal direction to beveling illustrated in FIG. 1 were butted against each other at their end faces and subjected to root pass welding by automatic gas tungsten arc welding, as in EXAMPLE 1. Note that, in the welding, the root pass welding was performed with a filler material having a chemical composition shown in Table 3 and having an outer diameter of 1.0 mm, thus obtained a welded joint. A heat input in the welding was set to about 5 kJ/cm, and Ar was used as shielding gas and back shielding gas, with its flow rate set to 10 L/min. The resultant welded joints were evaluated with the same criteria as in EXAMPLE 1.

As in EXAMPLE 1, a pair of steel plates having a thickness of 12 mm were subjected to beveling illustrated in FIG. 2 in a longitudinal direction, butted against each other, and subjected to multi-pass welding in the bevel by the automatic gas tungsten arc welding. In the welding, a filler material having a chemical composition shown in Table 4 and having an outer diameter of 1.2 mm was used. Heat input was set to about 9 to 12 kJ/cm and about 15 to 20 kJ/cm. Further, Ar was used as shielding gas and back shielding gas for the welding, with its flow rate set to 10 L/min. In a test with the heat input of about 15 to 20 kJ/cm, steel plates obtained from signs A and B shown in Table 1 were also used. Therefore, signs A and B in Table 8 correspond to the sign A and B in Table 1.

Each of the resultant welded joints was subjected to evaluation described below.

The resultant welded joints were subjected to the Charpy impact test under the same conditions as in EXAMPLE 1. Further, their absorbed energies were determined and evaluated by the same procedure as in EXAMPLE 1.

respective ranges specified in the present invention, and Ca/S satisfies the predetermined range, good impact properties of a weld heat affected zone can be provided under a wide range of welding conditions.

INDUSTRIAL APPLICABILITY

According to the present invention, duplex stainless steel tubes that enable an internal bead having a proper shape to be formed stably during butt welding and that provide a good toughness of a weld heat affected zone can be provided. These duplex stainless steel tubes can be suitably used as tubes for a heat exchanger in a petrochemical plant and a seawater processing plant and as a fuel injection tube mounted in an automobile.

The invention claimed is:
1. A duplex stainless steel tube comprising a chemical composition consisting of, in mass %:
C: 0.008 to 0.030%,
Si: 0.10 to 0.70%,
Mn: 0.80 to 2.60%,
P: 0 to 0.030%,
S: 0.0001 to 0.0050%,
O: 0.0004 to 0.0150%,
Sn: 0.0001% or more to less than 0.0100%,
Cu: 0.10 to 2.50%,

TABLE 8

| | | Welded joint | | | | |
| | | | | Charpy impact test | | |
| Test piece sign | Steel type | Capability of forming back bead | Shape of back bead | Heat input 9 to 12 kJ/cm | Heat input 15 to 20 kJ/cm | |
| A1<Table 5> | A | Good (Excellent) | Good (Excellent) | — | — | Inventive example |
| A10<Table 5> | | — | — | Good (Excellent) | — | |
| A11 | | — | — | — | Good (Acceptable) | |
| B1<Table 5> | B | Good (Excellent) | Good (Excellent) | — | — | |
| B10<Table 5> | | — | — | Good (Excellent) | — | |
| B11 | | — | — | — | Good (Acceptable) | |
| N1 | N | Good (Excellent) | Good (Excellent) | — | — | |
| N2 | | — | — | Good (Excellent) | — | |
| N3 | | — | — | — | Good (Excellent) | |
| O1 | O | Good (Excellent) | Good (Excellent) | — | — | |
| O2 | | — | — | Good (Excellent) | — | |
| O3 | | — | — | — | Good (Excellent) | |
| P1 | P | Good (Excellent) | Good (Excellent) | — | — | |
| P2 | | — | — | Good (Excellent) | — | |
| P3 | | — | — | — | Good (Excellent) | |
| Q1 | Q | Good (Excellent) | Good (Excellent) | — | — | |
| Q1 | | — | — | Good (Excellent) | — | |
| Q3 | | — | — | — | Good (Excellent) | |
| R1 | R | Good (Excellent) | Good (Excellent) | — | — | |
| R2 | | — | — | Good (Excellent) | — | |
| R3 | | — | — | — | Good (Excellent) | |
| S1 | S | Good (Excellent) | Good (Excellent) | — | — | |
| S2 | | — | — | Good (Excellent) | — | |
| S3 | | — | — | — | Good (Excellent) | |
| T1 | T | Good (Excellent) | Good (Excellent) | — | — | |
| T2 | | — | — | Good (Excellent) | — | |
| T3 | | — | — | — | Good (Acceptable) | |
| U1 | U | Good (Excellent) | Good (Excellent) | — | — | |
| U1 | | — | — | Good (Excellent) | — | |
| U1 | | — | — | — | Good (Acceptable) | |

From Table 8, it is understood that, since signs A to H satisfied the chemical composition specified in the present invention, test pieces obtained from them allowed their back beads to be formed sufficiently and to have good shapes. Further, it is understood that the test pieces offered good impact properties of their weld heat affected zones. It is also understood that, when the contents of S and Ca satisfies the Ni: more than 2.50% to 5.50% or less,
Cr: 21.5 to 25.5%,
Mo: 0.10 to 0.50%,
N: 0.050 to 0.200%,
Al: 0 to 0.200%,
Ca: 0 to 0.0100%,
Co: 0 to 0.80%, W: 0 to 0.80%,
Ti: 0 to 0.40%,
V: 0 to 0.40%,
Nb: 0 to 0.40%,
Ta: 0 to 0.40%,
Mg: 0 to 0.0100%,
B: 0 to 0.0100%, and
REM: 0 to 0.0800%,
with the balance: Fe and impurities, wherein
Fn1 given by Formula (i) below is 0.0040 to 0.0900,
Fn2 given by Formula (ii) below is 0.0180 or less, and
on an internal surface of the duplex stainless steel tube, an arithmetic average roughness Ra of the duplex stainless steel tube in a longitudinal direction is 1.0 to 9.0 μm, $$Fn1=4S+8O+Sn \qquad (i)$$

$$Fn2=4S+Sn \qquad (ii)$$

where symbols of elements in the formulas indicate contents (mass %) of the elements contained in the steel, and when an element is not contained, zero will be set to the corresponding symbol.

2. The duplex stainless steel tube according to claim 1, wherein the chemical composition contains, in mass %,
C: 0.012 to 0.020%,
Si: 0.20 to 0.60%,
Mn: 1.70 to 2.30%,
P: 0.028% or less,
S: 0.0001 to 0.0015%,
Cu: 0.25 to 2.00%,
Ni: 3.50 to 4.50%,
Cr: 22.5 to 24.5%,
Mo: 0.20 to 0.40%,
N: 0.100 to 0.180%, and
Al: 0.020% or less,
the Fn1 is 0.0050 to 0.0800, and
the Fn2 is 0.0140 or less.

3. The duplex stainless steel tube according to claim 1, wherein
the chemical composition contains, in mass %, Ca: 0.0005 to 0.0100%, and
a ratio between a content of Ca and a content of S, Ca/S, is 1.0 to 40.0.

4. The duplex stainless steel tube according to claim 1, wherein the chemical composition consists of one or more elements selected from, in mass %:
Co: 0.01 to 0.80%,
W: 0.01 to 0.80%,
Ti: 0.01 to 0.40%,
V: 0.01 to 0.40%,
Nb: 0.01 to 0.40%,
Ta: 0.01 to 0.40%,
Mg: 0.0005 to 0.0100%,
B: 0.0002 to 0.0100%, and
REM: 0.0005 to 0.0800%.

5. A welded joint including the duplex stainless steel tube according to claim 1, wherein an internal bead has a bead width of 1.0 mm or more and a bead height of 1.5 mm or less.

6. The duplex stainless steel tube according to claim 2, wherein
the chemical composition contains, in mass %, Ca: 0.0005 to 0.0100%, and
a ratio between a content of Ca and a content of S, Ca/S, is 1.0 to 40.0.

7. The duplex stainless steel tube according to claim 2, wherein the chemical composition consists of one or more elements selected from, in mass %:
Co: 0.01 to 0.80%,
W: 0.01 to 0.80%,
Ti: 0.01 to 0.40%,
V: 0.01 to 0.40%,
Nb: 0.01 to 0.40%,
Ta: 0.01 to 0.40%,
Mg: 0.0005 to 0.0100%,
B: 0.0002 to 0.0100%, and
REM: 0.0005 to 0.0800%.

8. The duplex stainless steel tube according to claim 3, wherein the chemical composition consists of one or more elements selected from, in mass %:
Co: 0.01 to 0.80%,
W: 0.01 to 0.80%,
Ti: 0.01 to 0.40%,
V: 0.01 to 0.40%,
Nb: 0.01 to 0.40%,
Ta: 0.01 to 0.40%,
Mg: 0.0005 to 0.0100%,
B: 0.0002 to 0.0100%, and
REM: 0.0005 to 0.0800%.

9. The duplex stainless steel tube according to claim 6, wherein the chemical composition consists of one or more elements selected from, in mass %:
Co: 0.01 to 0.80%,
W: 0.01 to 0.80%,
Ti: 0.01 to 0.40%,
V: 0.01 to 0.40%,
Nb: 0.01 to 0.40%,
Ta: 0.01 to 0.40%,
Mg: 0.0005 to 0.0100%,
B: 0.0002 to 0.0100%, and
REM: 0.0005 to 0.0800%.

10. A welded joint including the duplex stainless steel tube according to claim 2, wherein an internal bead has a bead width of 1.0 mm or more and a bead height of 1.5 mm or less.

11. A welded joint including the duplex stainless steel tube according to claim 3, wherein an internal bead has a bead width of 1.0 mm or more and a bead height of 1.5 mm or less.

12. A welded joint including the duplex stainless steel tube according to claim 6, wherein an internal bead has a bead width of 1.0 mm or more and a bead height of 1.5 mm or less.

* * * * *